(12) United States Patent
Lastrucci

(10) Patent No.: US 8,861,776 B2
(45) Date of Patent: Oct. 14, 2014

(54) ELECTROMECHANICAL CONVERSION SYSTEM WITH MOVING MAGNETS; ACOUSTIC DIFFUSER COMPRISING SAID SYSTEM AND A MOVING MEMBER THAT GENERATES SOUND WAVES

(76) Inventor: Claudio Lastrucci, Lastra a Signa (IT)

( * ) Notice: Subject to any disclaimer, the term of this patent is extended or adjusted under 35 U.S.C. 154(b) by 0 days.

(21) Appl. No.: 13/636,819

(22) PCT Filed: Mar. 21, 2011

(86) PCT No.: PCT/IT2011/000081
§ 371 (c)(1),
(2), (4) Date: Sep. 24, 2012

(87) PCT Pub. No.: WO2011/125083
PCT Pub. Date: Oct. 13, 2011

(65) Prior Publication Data
US 2013/0010999 A1    Jan. 10, 2013

(30) Foreign Application Priority Data
Mar. 25, 2010    (IT) ................. FI2010A0050

(51) Int. Cl.
*H04R 11/00*    (2006.01)
*H02K 33/16*    (2006.01)
*H04R 11/02*    (2006.01)

(52) U.S. Cl.
CPC ............... *H02K 33/16* (2013.01); *H04R 11/02* (2013.01)
USPC ........ 381/396; 381/412; 381/190; 310/12.24; 310/12.21; 310/12.01

(58) Field of Classification Search
CPC ........ H04R 11/00; H04R 11/02; H04R 11/09; H04R 15/00; H04R 19/02; H04R 19/04; H04R 2400/07; H04R 11/06; H04R 1/24; H04R 1/00; H04R 9/02; H04R 9/025; H04R 9/06; H04R 9/063; H04R 13/02; H04R 33/00; H04R 9/00
USPC ......... 381/150, 190, 398, 400, 407, 409, 410, 381/412, 416; 310/12.16
See application file for complete search history.

(56) References Cited

U.S. PATENT DOCUMENTS

| 3,917,914 | A | 11/1975 | Parker |
| 7,263,199 | B2* | 8/2007 | Trandafir ...................... 381/409 |
| 2003/0161493 | A1* | 8/2003 | Hosler .......................... 381/353 |
| 2006/0028072 | A1 | 2/2006 | Iwasa et al. |
| 2009/0295253 | A1* | 12/2009 | Yarger et al. ........... 310/216.003 |

FOREIGN PATENT DOCUMENTS

| EP | 1 450 472 A1 | 8/2004 |
| JP | 56 046399 A | 4/1981 |
| JP | 3 112354 A | 5/1991 |
| JP | 6 315 255 A | 11/1994 |
| JP | 2000-32730 | * 1/2000 ............. H02K 33/16 |

* cited by examiner

*Primary Examiner* — Brian Ensey
*Assistant Examiner* — Sabrina Diaz
(74) *Attorney, Agent, or Firm* — McGlew and Tuttle, P.C.

(57) ABSTRACT

The invention relates to an electromechanical conversion system comprising: a fixed supporting structure, a movable element with respect to the fixed structure; at least one excitation coil; and at least one permanent magnet for generating an excitation magnetic field. The permanent magnet is integral with the movable element and the coil is integral with the fixed supporting structure. Moreover, a ferromagnetic circuit is provided fixed with respect to the structure and cooperating with the permanent magnet.

27 Claims, 10 Drawing Sheets

STATO DELLA TECNICA

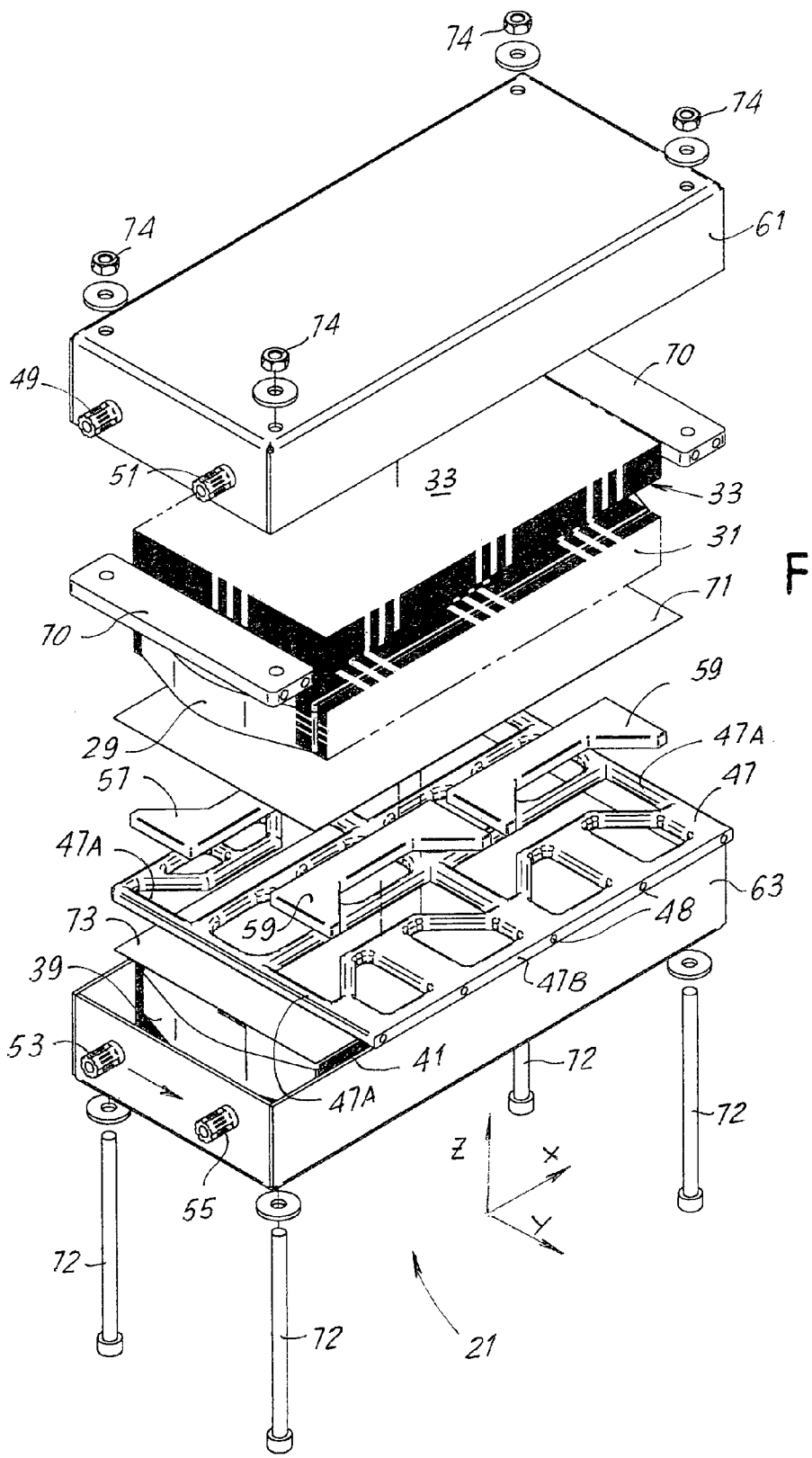

ELECTROMECHANICAL CONVERSION SYSTEM WITH MOVING MAGNETS; ACOUSTIC DIFFUSER COMPRISING SAID SYSTEM AND A MOVING MEMBER THAT GENERATES SOUND WAVES

TECHNICAL FIELD

The present invention relates to an electromechanical conversion system comprising a permanent magnet structure and an electrically conductive coil in which a variable current constituting the excitation signal circulates, to cause relative movement between coil and permanent magnets.

The invention also relates to an acoustic diffuser comprising an electromechanical conversion system to control the movement of the diaphragm that generates the sound waves under the control of an electrical signal coming from an amplifier.

STATE OF THE ART

Transduction systems of conventional electrodynamic type typically use structures composed of two fundamental parts: a magnetic structure integral with the fixed parts of the acoustic diffuser, which produces the necessary excitation static magnetic field; and a moving part, essentially constituted by the coil excited by the electrical signal to be reproduced, which is constrained rigidly to a radiant diaphragm constituting the mechanical-acoustic coupling of the system.

Notwithstanding its widespread use, this configuration imposes some important limitations in the implementations that can be produced:

1) the moving part, formed by the coil, by the diaphragm and by the respective mechanical constraint elements, must be very light, otherwise there will be a noteworthy reduction in electro-acoustic conversion efficiency;
2) the moving part of the electro-acoustic transducer, formed by the coil, must be electrically connected to an electric supply system of the coil. The supply system is usually integral with a mechanical part which is disengaged from the coil. This normally takes place through flexible electrical connections that are subject to mechanical stress, in conditions of large displacements of the movable element, or electrical stress, in the case of large excitation currents, or even both types of stress simultaneously;
3) the need to maintain great mechanical precision in the air gap of the magnetic circuit, to prevent the moving coil from rubbing against the fixed part of the magnetic circuit;
4) it is also extremely unproductive to increase the coupling tolerances to allow a looser coupling of the parts in relative motion as the reduction of magnetic induction depends closely on the dimensions of the air gap;
5) the electrical power required for moving parts to perform their movement is essentially dissipated in the moving coil, subjecting mechanically weak parts that are unable to dissipate heat efficiently to great thermal stress;
6) the conversion efficiency of the system is influenced by the mass of the conductor constituting the moving coil, which cannot be too heavy and therefore able to dissipate large quantities of power for the aforesaid reason.

SUMMARY OF THE INVENTION

The object of the present invention is to provide an electrodynamic conversion system that allows one or more of the drawbacks of conventional systems to be overcome, either completely or in part.

Substantially, the invention provides for inversion of the functions of the parts, i.e. use of the moving part as magnetic excitation structure and placing of, the electrical excitation part, i.e. the coil, integral with the fixed structure of the acoustic diffuser.

Solutions of the aforesaid type are already known, but the particular implementation of the present invention makes it possible to obtain considerably higher conversion efficiencies, allowing use in acoustic reproduction devices for hi fidelity systems, and guarantees high mechanical robustness.

Typically, a moving magnet system of known type does not guarantee inductions in the air gap sufficient to provide adequate forces in the applications of interest for the present invention. The largest problem is that the excitation coil, made of electrically conductive material, is typically non-ferromagnetic. Consequently, known systems with fixed coil and moving magnet do not allow a low reluctance to be obtained in the magnetic circuit formed by the parts of the electrodynamic conversion system, and therefore require large quantities of magnetic material to increase the circulating magnetic flux. The increase of the quantity of magnetic material is an extremely negative factor, as it increases the moving mass of the system. For this reason, systems with fixed coil and moving magnet have not been applied in high performance acoustic diffusers.

The present invention, vice versa, provides for the production of a fixed excitation coil made by combining ferromagnetic materials with low losses and non-magnetic electrically conductive materials.

The combination of the two materials, together with the construction geometry, make it possible to obtain a fixed excitation coil that does not appreciably penalize the induction efficiency of the permanent moving magnet and allows the electrical resistance value of the fixed excitation coil to be decreased at will, compatibly with the dimensions and weights required.

In practice, according to one embodiment, the invention provides for an electromagnetic conversion system comprising: a fixed supporting structure, an element movable with respect to said fixed structure, at least one excitation coil, and at least one permanent magnet for generating an excitation magnetic field; wherein the movable element is integral with the magnet and the coil is integral with the fixed supporting structure; and wherein the coil is associated with a ferromagnetic circuit or itself forms a ferromagnetic circuit fixed with respect to the fixed structure.

In this second case the electrical conductor that forms the coil must have ferromagnetic properties.

Preferably, an electrical conductor is used to manufacture the coil and a different, ferromagnetic material is used to manufacture the fixed ferromagnetic circuit. In some embodiments, the ferromagnetic material can be in the form of laminae or plates interposed at least in part between the coil turns.

In brief, the configuration of the transducer or electromechanical or electrodynamic conversion system allows the resistance value of the excitation coil to be decreased at will without requiring to increase the quantity of moving magnetic material and without decreasing the induction efficacy for a given type of magnet used as movable element of the system.

In other words, with the present invention the decrease in resistance of the fixed excitation coil is made independent with respect to the other magnetic parameters (induction) and mechanical parameters (moving mass).

Hereafter reference will be made in particular to a system used for converting electrical energy into mechanical energy to generate a force applicable to a moving member and therefore if necessary to cause displacement thereof controlled by means of an electrical signal. In particular, application of the conversion system to acoustic generation, i.e. as the motor of an acoustic diffuser will also be described.

However, it must be understood that the conversion system according to the invention can also be used inversely, i.e. to convert a force and a displacement into electrical energy and therefore, for example, to produce a displacement or vibration sensor, which generates an electrical signal as a function of a displacement or of a mechanical stress on a member to which the sensor is applied. In some applications, it would also be possible to use the conversion system to generate useful electrical energy, converting mechanical energy into electrical energy to be accumulated or used directly.

According to some embodiments of the invention, a mechanical arrangement is provided in which the fixed excitation coil is formed by a winding substantially rectangular in shape formed by a strip conductor including ferromagnetic elements interposed, with a constant pitch, between the turns of the coil to allow high permeability according to the winding axis of the coil. The ferromagnetic elements are preferably constituted by preferably planar laminae or plates made of ferromagnetic material arranged between preferably rectilinear contiguous segments of adjacent turns formed by the conductive material. Preferably, the conductor forming the coil is in the shape of a strip, in the sense that it has a cross section of rectangular shape, with one side much larger than the other, the major side being parallel to the axis of winding of the coil, hereafter indicated as Z axis.

In a preferred embodiment of the invention, the motor or electromagnetic conversion system is assembled by superimposing along the Z axis two or more rectangular coils manufactured as defined above and connecting them electrically in series or in parallel or separately excited. Moreover, the movable element to which one or more permanent magnets are constrained, is inserted inside the space obtained by suitably spacing the coils apart from one another. In other less advantageous embodiments, a single coil can be provided associated with a fixed ferromagnetic circuit.

To form a complete static magnetic circuit, the plates interposed between the turns of the coils are interfaced with portions of magnetic circuit outside the coil or coils. These portions of magnetic circuit can in turn be formed by sets of plates in a known manner, to prevent or reduce losses due to eddy currents in the bulk of ferromagnetic material.

In some embodiments, the movable element comprises at least two magnetic segments, i.e. two permanent magnets, substantially rectangular in shape. In some embodiments, the magnets are appropriately shaped to generate a return force toward a position of minimum reluctance, as will be described in more detail hereafter. The permanent magnets are oriented so as to create a static circulation of magnetic flux inside the closing circuit formed by the plates interposed between the turns of the excitation coils and by the portions of magnetic circuit placed outside the coils and forming a magnetic closing portion of the circuit, outside the coils and the air gap formed between the coils by the plates interposed between the turns of these coils.

The movable element is in magnetic balancing conditions inside the ferromagnetic structure thus formed, so that the forces of attraction toward the two closing elements of the magnetic circuit are substantially totally equivalent. In substance, as the permanent magnets are arranged between two opposed portions of the ferromagnetic circuit, the forces of attraction between magnets and ferromagnetic mass of the circuit are balanced and the movable element is floating, i.e. "held suspended" between the two opposed coils, between which the air gap is formed between the projecting edges of the plates interposed between the turns of the coils.

Preferably, some embodiments also provide for low friction sheets to be arranged on the surfaces of the mutually opposed excitation coils facing the movable element. In this manner, although the magnetic forces parallel to the Z axis of the coaxial and opposed coils exerted on the movable element are for the most part balanced by the geometry of the magnetic circuit, any constructional imperfections, tolerances or perturbations due to external forces are supported by a low friction coupling, due to the presence of the sheets which delimit the empty space of the air gap in which the movable element with the magnet or magnets integral therewith is housed and is caused to move. The sheets can be made of PTFE or other materials with a low friction coefficient.

Moreover, according to some embodiments of the invention, liquid ferromagnetic materials, or "ferrofluid" can be used as lubricant in the air gap. These ferromagnetic liquid lubricants take advantage of the presence of the static magnetic field generated by the moving magnets, and are maintained suitably distributed in the areas of greatest friction between the magnets of the movable element and the low friction sheets, due to the effect of the magnetic field. These fluids can produce effective hydrodynamic lubrication during the relative movement between the moving magnetic element and the fixed excitation coils. In other embodiments dry lubricants, based on graphite or other products with similar lubricating properties, can be used. In further embodiments, the moving part of the device can be supported by means of bearings, for example rolling bearings.

The geometry of the permanent magnets can be easily adapted to perform some useful functions:

1) magnetic centering according to an axis (hereafter referred to as X axis) orthogonal to the winding axis of the coils and to the direction of movement of the movable element caused by the electrical excitation signal in the coils. This is possible by designing the magnetic circuit appropriately so as to obtain a definite return of the movable element toward the central axis of symmetry parallel to the direction of motion of the movable element induced by the electrical signal. This centering is possible, creating a path with minimum reluctance in the required rest position and imposing, again with the geometry of the magnetic structure constituted by the permanent magnets, a large variation of reluctance for each small deviation from this rest position;

2) creation of a magnetic elastic return with respect to the rest position along the axis (hereafter referred to as Y axis) parallel to the direction of movement of the movable element. In some applications it is preferable to have a linear return force in the direction of the main movement, i.e. parallel to the Y axis. In the present invention it is possible, again with a particular geometry of the magnets, to configure the movable element so as to obtain a return force that magnetically emulates the return of an elastic force of the type $F=-KY$, where F is the return force, K is a constant and Y is the displacement along the Y axis. By appropriately shaping the movable element it is possible to obtain great linearity and consistency of the resulting force. It is also possible to produce return forces with different action profiles with respect to an ideal linear elastic force by means of appropriate geometrical modifications of the magnetic circuit;

3) production of a magnetic "limit stop" function in the direction of the main movement according to the Y axis, not subject to wear or damage, which is again based on the geometry of the structure of the movable element of the fixed excitation coil and of the containment structure of the system.

In some embodiments, the system according to the invention provides for a movable element with at least two permanent magnets mutually connected mechanically and arranged between the two coils, the two permanent magnets being configured and positioned in a substantially symmetrical manner with respect to a plane orthogonal to the mutually opposed faces of the coils and to the direction of the main movement (according to the Y axis) of the movable element caused by the circulation of electric current in said coils. Preferably, the two permanent magnets are arranged with opposite polarities, one permanent magnet being oriented with the north pole toward a first coil and with the south pole toward the second coil and the other permanent magnet being oriented with the south pole toward the first coil and with the north pole toward the second coil.

In some embodiments, the permanent magnets of the movable element each comprises an edge facing the outside of the air gap and substantially orthogonal to the direction of the main movement according to the Y axis, induced by the electric current circulating in the coils. Each of said edges has sloping end segments, forming appendages of magnetic material extending toward the outside of the air gap with respect to the central portion of the respective edge. The appendages of magnetic material formed on each permanent magnet are substantially symmetrical with respect to a plane parallel to the direction of the main movement. As will be better described hereafter with reference to some embodiments, in this manner a centering and return effect of the movable element to a central rest position is obtained due to the shaped form of the ends of the magnet. At the same time, a rectilinear portion of the edge of the magnet, orthogonal to the direction of motion and parallel to rectilinear segments of the turns forming the coils, magnetically forms a stop that limits the relative movement between movable element and fixed excitation coils.

Further advantageous features and embodiments of the electromechanical conversion system are set forth in the attached claims.

The structure of the system according to the invention, according to the embodiment adopted, also has one or more of a series of further advantages summarized in the following points:

1. Absence of electrical conductors that connect parts in relative motion, as the moving part is a simple arrangement of permanent magnets and does not require any type of electrical connection for excitation;
2. Noteworthy increase in the dimension and surface area of the dissipating parts, as the excitation coils, the dissipating part of the system, can be easily cooled since they are external elements with large dimensions;
3. Reduction in the quantity of magnetic material used, which although being of high quality, is used approximately 20 times more efficiently compared to a system with conventional moving coil having the same performance;
4. Simple to produce, without requiring particular mechanical coupling devices;
5. Durability of the system and consistency of performance over time. Incidentally, as the return forces, centering and the limit stop function are all accomplished by a suitable configuration of the magnetic circuit, these values are extremely predictable and consistent over time, as they are not subject to mechanical wear and aging. In conventional technology, wear of pliable parts and aging of the mechanical suspensions, together with large variations of electrical resistance of the moving coil as a function of the power applied, cause a behavior that is anything but predictable and unchangeable according to conditions of use and aging;
6. Mechanical robustness: the system is based on a movement with magnetic balancing, with controlled friction, if necessary with hydrodynamic lubrication, or with rolling supports, which allows considerable misalignment stress to be sustained without this causing damage to the system in question;
7. Increase in electroacoustic conversion efficiency;
8. Easy maintenance, as the coil/movable element assembly is easy to disassemble, inspect and recondition if phenomena of wear should occur after prolonged use;
9. Easy to adapt the excursion and force performances obtainable simply by suitably configuring the structure of the movable element, without altering the basic structure of the excitation coils ad of the ferromagnetic closing circuit.

BRIEF DESCRIPTION OF THE DRAWINGS

The invention will be better understood by following the description and accompanying drawing, which shows practical non-limiting embodiments of the invention. More in particular, in the drawing:

FIG. 8 shows an exploded view of a modified embodiment of the system according to the invention;

DETAILED DESCRIPTION OF EMBODIMENTS OF THE INVENTION

Figure 1:
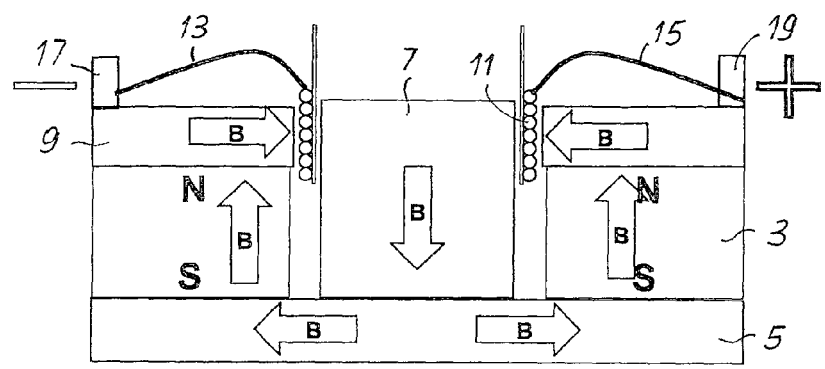
FIG. 1 shows an axial section of a conventional electromechanical conversion system with a moving coil.

FIG. 1 shows a diagram of an electromechanical conversion device or system of conventional type with a moving coil. The system, indicated as a whole with 1, comprises a permanent magnet of toroidal shape 3 represented in FIG. 1 in a section according to an axial plane. The toroidal permanent magnet 3 is inserted inside a ferromagnetic circuit comprising an outer portion 5, an axial core 7 and a ring 9. The letter B indicates the magnetic flux inside the circuit 5, 7, 9 while N and S indicate the north and south poles respectively of the permanent magnet 3. A moving coil 11, formed by a helically wound electrical conductor, is inserted in the air gap defined between the annular portion 9 and the core 7 of the ferromagnetic circuit. The moving coil 11 is connected by means of conductive elements 13 and 15 to two external connections 17 and 19 indicated as positive and negative pole of an electrical circuit for supplying the excitation signal to the moving coil 11. Supplying electrical signals to the coil 11 causes, in a known manner, movement with respect to the fixed magnet.

The drawbacks of a conventional system of this type have been set forth in the introductory part of this description.

Figure 2:
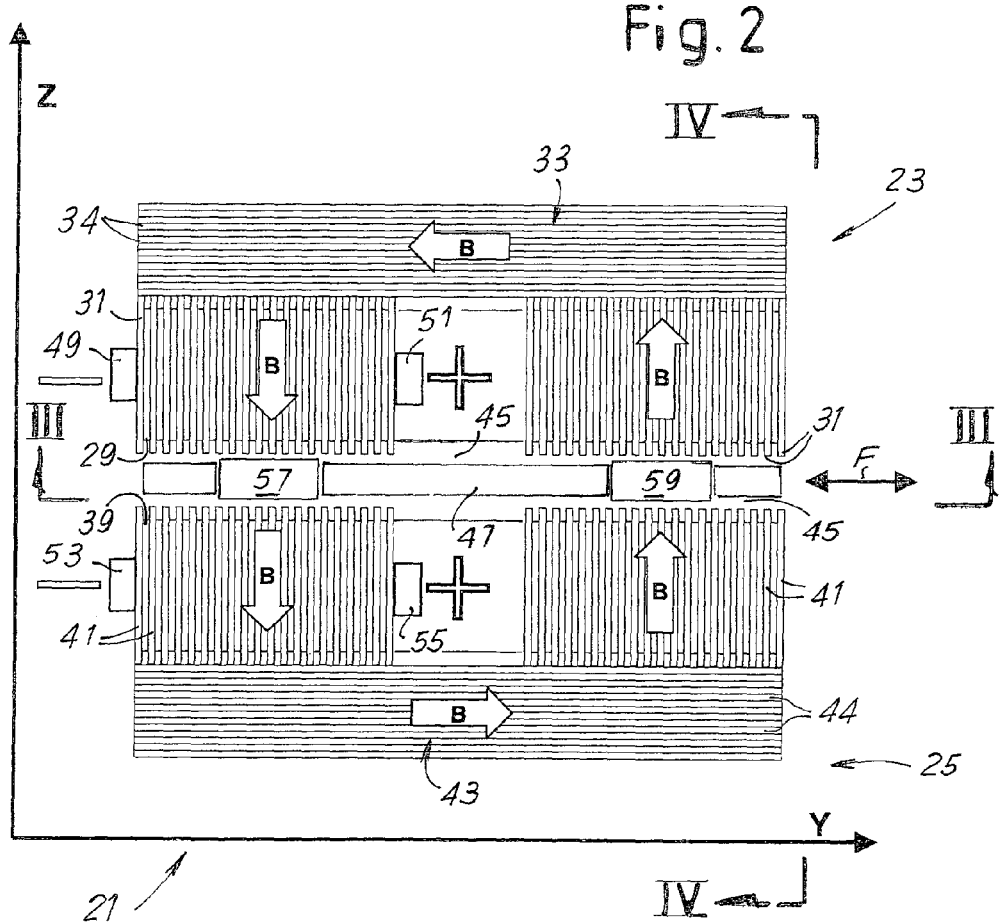
FIG. 2 shows a section according to a plane parallel to the winding axis and to the movement of the movable element of a conversion system according to the invention.

FIG. 2 shows in a section according to a plane containing the winding axis of the coils, an electromechanical conversion system according to the invention. FIG. 2 and the subsequent figures up to FIG. 7 indicate, for easy reference, three Cartesian axes indicated with X, Y and Z. The Z axis is parallel to the winding axis of the excitation coils of the electromechanical conversion system, the Y axis is parallel to the direction of the force applied to the movable element described below (with which the permanent magnets are integral) induced by the electrical signals supplied to the coils. This force causes displacement in the same direction Y if the element is free to move; and the letter X indicates an axis orthogonal to the Z axis of winding of the coils and to the Y axis of main movement of the movable element.

Figure 3:
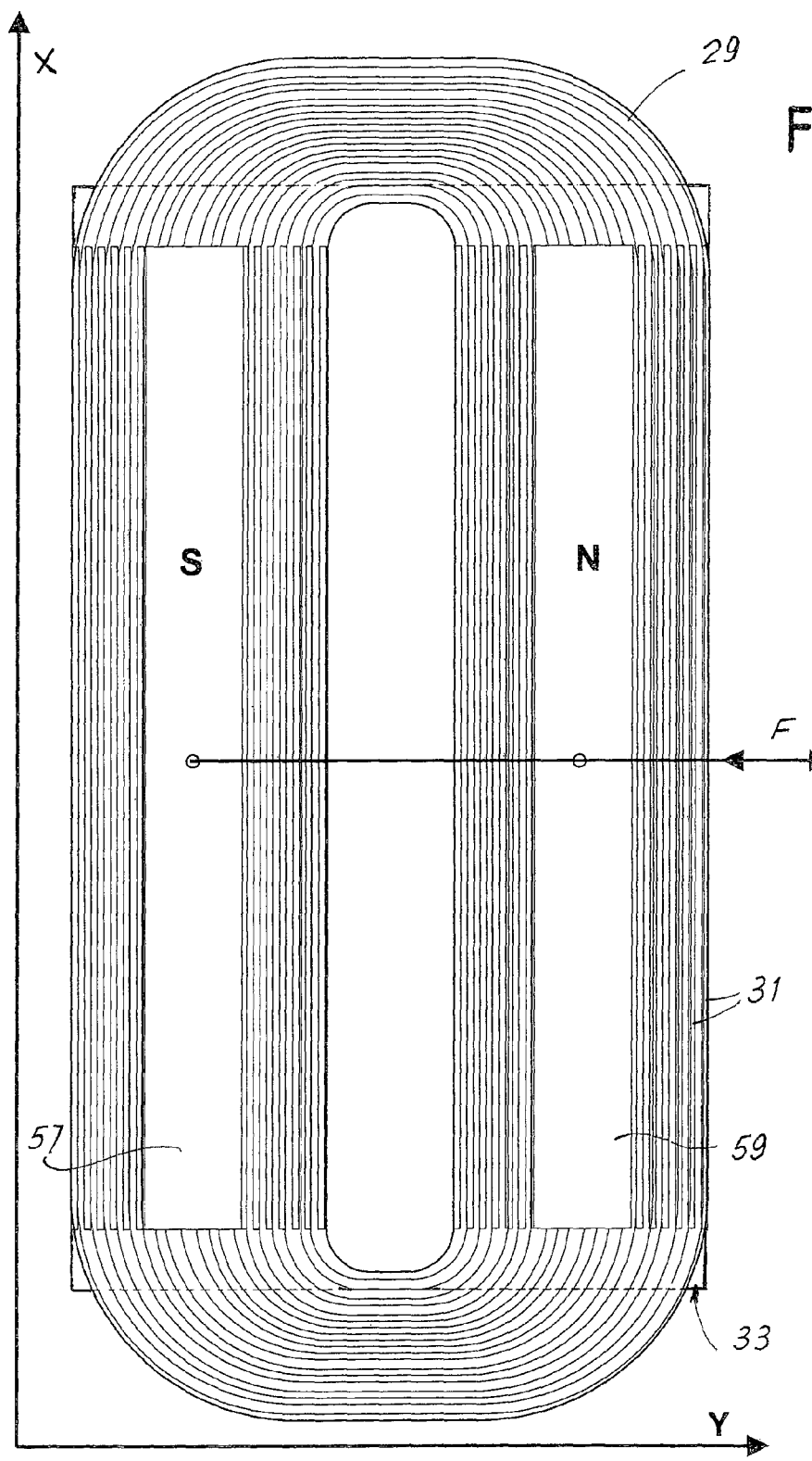
FIG. 3 shows a view according to III-Ill of FIG. 2, i.e. according to a plane orthogonal to the Z axis of winding of the coil.

In the embodiment shown, the electromechanical conversion system, indicated as a whole with 21, comprises two substantially symmetrical parts 23 and 25. The part 23 comprises (see also FIG. 3) a coil 29 formed by winding about the Z axis a strip conductor, i.e. formed by a strip of electrically conductive material, typically but not necessarily copper, having a cross section of elongated rectangular shape. In the embodiment illustrated the ratio between the major side and the minor side of the cross section is greater than 10. The winding of the conductor forming the coil 29 is such that the coil takes a substantially rectangular shape (FIG. 3). Substantially rectangular is intended as a shape in which substantially rectilinear portions of the various conductor turns forming the coil 29 can be identified. Moreover, the rectilinear segments of the winding have different lengths defining a major side and a minor side of the rectangular coil. The major and minor sides of the rectangle are joined by curved areas of the windings of the conductor forming the coil 29. The turns formed by the strip conductor of the coil 29 extend alongside one another in a same position along the Z axis, i.e. the turns form a set of turns with an axial extension equal to the height of the strip conductive material. The strip is wound so that the long side of the elongated rectangular cross section of the strip is arranged parallel to the winding axis Z.

Plates 31 of ferromagnetic material are interposed between contiguous turns of the coil 29. In some embodiments two plates can be provided between each turn and the adjacent turn. As shown in FIGS. 2 and 3, the plates 31 have a substantially flat extension and are inserted between the turns on the long sides of the rectangle formed by the winding of the coil 29. In other words, the plates 31 lie on planes parallel to the XZ plane and have an elongated rectangular extension in the direction of the X axis.

In some preferred embodiments of the invention, as illustrated in the drawing, the plates 31 project from the turns forming the coil 29 on both faces of the coil. On the outside face (i.e. opposite the part 25 of the conversion system 21) an outside portion of ferromagnetic circuit 33 is interfaced with the plates 31. This portion of ferromagnetic circuit 33 can preferably be constituted by a series of plates made of ferromagnetic material 34, electrically isolated from one another to limit the circulation of eddy currents.

The part 25 of the electromechanical conversion system 21 is substantially symmetrical to the part 23 described above. In the figures, the numeral 39 indicates the second excitation coil, also formed by a strip conductor. The numeral 41 indicates the plates interposed between the turns formed by the conductor that forms the coil 39, the numeral 42 indicates a portion of ferromagnetic circuit interfaced with the portions of the plates 41 projecting toward the outside and the numeral 44 indicates the plates forming the portion of ferromagnetic circuit 43.

Between the two parts 23 and 25 of the electromechanical conversion system 21 an air gap 45 is implemented, which houses a movable element indicated schematically with 47, which moves in a controlled manner according to the double arrow F due to the force generated on the permanent magnets integral therewith by the circulation of electric current in the excitation coils 29 and 39. The excitation signal to these coils is supplied through electrical connections 49, 51 for the coil 29 and 53, 55 for the coil 39. The arrows B indicated the static magnetic flux of the field generated by permanent magnets 57 and 59 which are part of the movable element 47, which hereinafter will also be indicated as moving magnetic element.

The permanent magnets are arranged with inverted north and south poles, as can be seen in particular in FIG. 2, where the sign of the poles is indicated with the letters S and N. In other words, the magnet 57 is arranged with its south pole facing the excitation coil 29 and with the north pole facing the excitation coil 39, while the magnet 59 is oriented with the north pole facing the coil 29 and with the south pole facing the coil 39. The structure is such that the static magnetic field generated by the permanent magnets 57 and 59 circulates (arrow B) in the ferromagnetic circuit formed by the plates 31, 41, 44 and 34. Due to the arrangement of the ferromagnetic circuit and of the permanent magnets, the moving magnetic element is substantially suspended in the air gap 45. As can be observed, for example, in FIG. 2, the flux of the magnetic field B is oriented in the following manner: in the portion of ferromagnetic circuit inside the coil 39, the flux is substantially parallel to the axis of the coil and therefore parallel to the major surfaces of the plates 31 and of the strip of electrically conductive material forming the coil 39. In the part of ferromagnetic circuit outside the coil 39, i.e. in the plates 34, 44, the magnetic flux B is oriented in a direction substantially orthogonal to the main faces of the plates 31, 41 and to the axis of the coil 39. It must be understood that in the transition areas between plates 34, 44 and plates 31, 41, the flux lines, i.e. the lines defining the magnetic field, are curved. The conditions of parallelism and orthogonality defined above must be intended as referred to the central area of the respective portions of ferromagnetic circuit, without considering the edge effects.

As can be understood from the description above, the electromechanical conversion system according to the invention includes a fixed part (with respect to an outside structure, for example the box of an acoustic diffuser) which comprises both an electrically conductive part constituted by the excitation coils 29 and 39, and a ferromagnetic part defining the ferromagnetic circuit 33, 31, 41, 43. The moving magnetic element 47 is arranged in the air gap 45 defined inside the ferromagnetic circuit.

As can be observed in FIG. 3, which shows a first possible shape of permanent magnets 57 and 59, these latter have a shape elongated according to the X axis of the device, so that the major sides are parallel to the major sides of the rectangular windings of the coils 29 and 39. In FIG. 3 the mechanical connection structure between the two permanent magnets 57 and 59 has been omitted, while in FIG. 2 it is represented schematically by the line 47 and a practical embodiment of which will be described with reference to FIG. 8. The position illustrated in FIG. 3 is a rest position of the magnets 57 and 59, centered with respect to the median plane parallel to the X axis of the coils 29 and 39.

Figure 4:
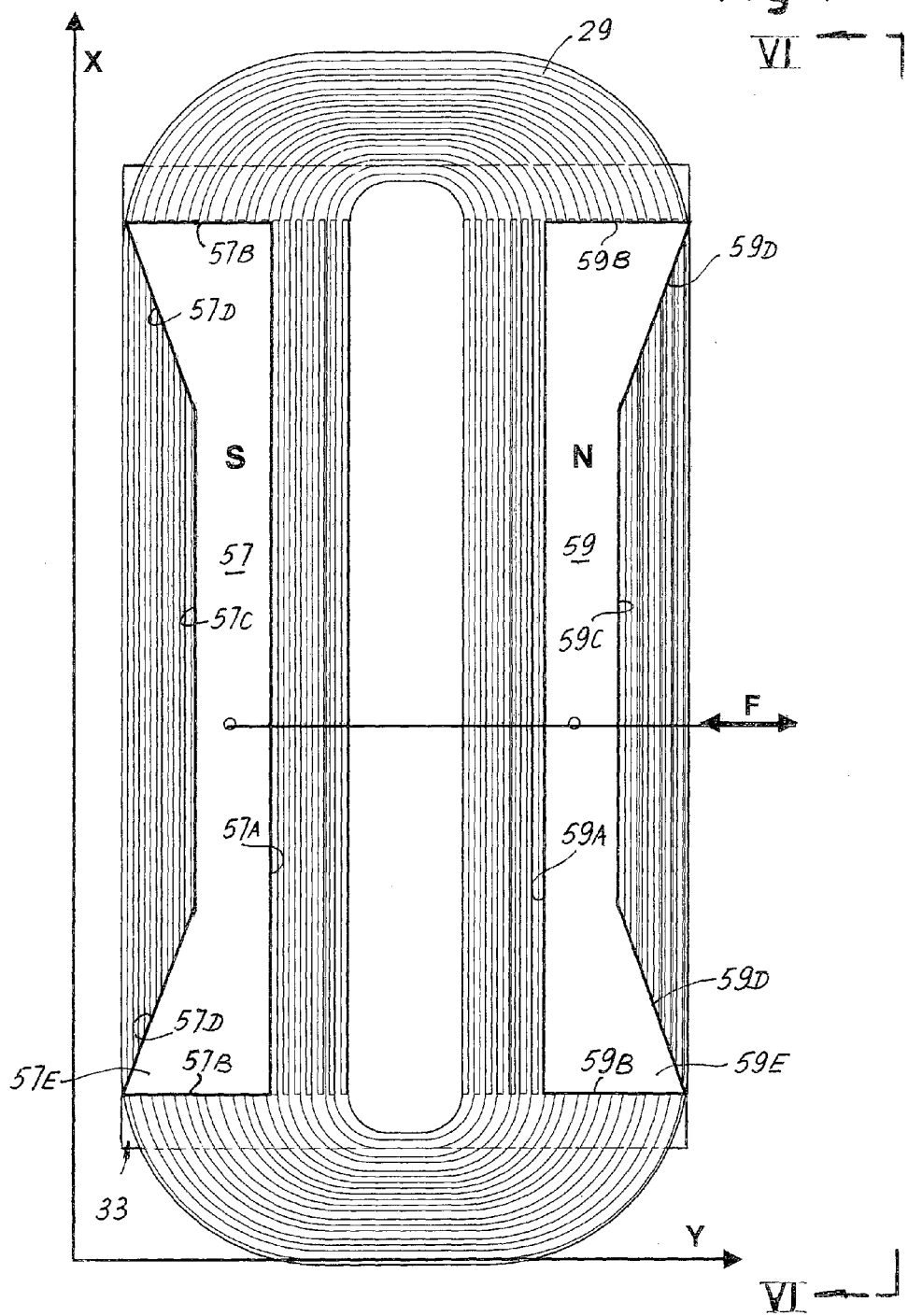
FIG. 4 shows a section similar to the section of FIG. 3 with a modified embodiment of the magnets.

FIG. 4 shows an improved embodiment, in which the permanent magnets 57 and 59 have a substantially rectangular shape, but equipped with shaped appendages facing outside the air gap and therefore facing the outside of the coils between which the moving magnetic element 47 with the magnets 57 and 59 is housed.

More in particular, in the embodiment of FIG. 4, each permanent magnet 57, 59 has a respective rectilinear edge 57A and 59A facing the center of the air gap and parallel to the X axis and therefore to the long segments of each turn of the winding of the coils. Each magnet also has two edges of minor dimensions 57B and 59B, parallel to the Y axis and oriented laterally toward the outside of the air gap. Finally, each magnet has a respective edge oriented toward the outside of the air gap 45, formed by a central rectilinear segment 57C and 59C, parallel to the respective edge 57A and 59A, and by shaped end segments 57D and 59D respectively. In the example shown the shaped segments 57D and 59D have a sloping rectilinear orientation with respect to the X and Y axes, while the central segment 57C is parallel to the X axis and orthogonal to the Y axis. It would also be possible to shape the segments 57D, 59D of the edges of the two magnets differently, for example with a concave or convex curvilinear shape, with a stepped shape or with any other shape suitable for the purposes explained below. In any case, the rectilinear portion 57C, 59C of each of the two edges is preponderant with respect to the shaped area 57D, 59D. Moreover, the shape of the edge 57C, 57D and 59C, 59D is such as to form appendages 57E and 59E of magnetic material projecting toward the outside of the air gap 45 in the Y direction, i.e. in the direction of the main movement imparted to the moving magnetic element by the electrical signals supplied to the excitation coils 29 and 39.

This particular configuration makes it possible to obtain three additional functions, which shall now be described with particular reference to FIGS. 4 to 7.

In FIG. 4 the moving magnetic element 47 with which the permanent magnets 57 and 59 are integral is positioned in a central position with respect to the windings of the coils 29 and 39. This is a position of minimum reluctance for the magnetic circuit in which the pair of permanent magnets 57, 59 is inserted. When, due to an external force the moving magnetic element translates along the main direction of the movement according to the Y axis, it can take the position shown in FIG. 5, where the appendices 59D of magnetic material of the permanent magnet 59 project at least partly from the ferromagnetic circuit. As a consequence of this displacement, the reluctance of the circuit increases and therefore a magnetic return force, indicated with FRY, is applied to the moving magnetic element 47 integral with the permanent magnets 57, 59, which tends to return the whole system to conditions of minimum energy, i.e. of minimum reluctance, of FIG. 4.

Figure 5:
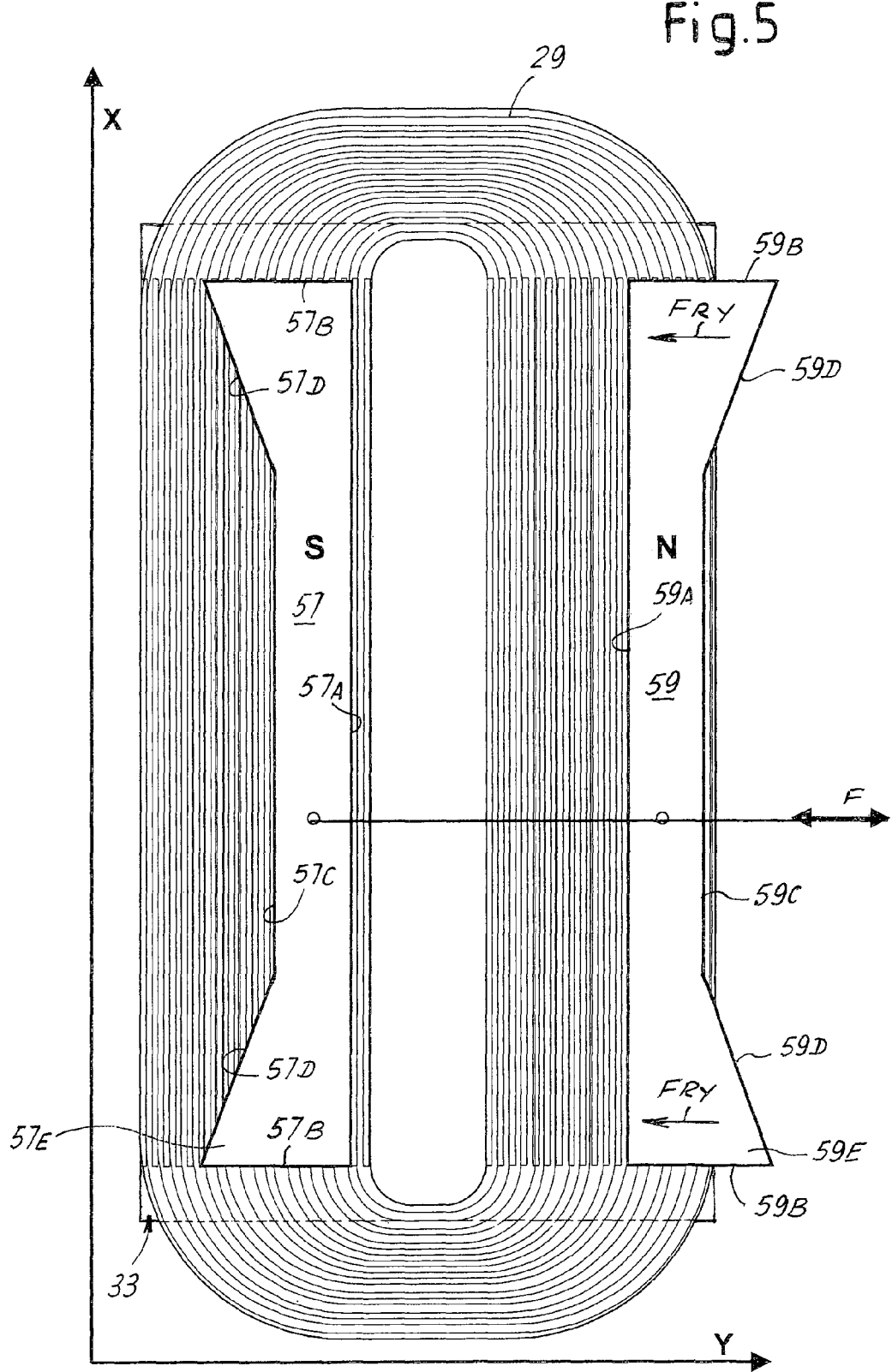
FIG. 5 shows a section similar to that of FIG. 4 with the movable element displaced in the direction of the main movement imparted by the electrical signal on the excitation coils.

As can be easily understood by observing FIG. 5, the return force FRY increases linearly with displacement from the position of FIG. 4 toward the position of FIG. 5. This is due to the fact that the mass of magnetic material that is gradually displaced toward the outside of the magnetic circuit increases linearly due to the shape of the edge portions 59D of the permanent magnet 59. Therefore, the magnetic return force has a linear behavior equivalent to that of an elastic force. By shaping the edges 59D differently, it is possible to obtain a different behavior of the return force FRY with respect to the displacement of the moving magnetic element according to the Y axis.

This return force FRY is in substance the equivalent of an elastic force imparted by an elastic return element. However, contrary to what occurs with elastic elements of mechanical type, such as a helical spring, in this case the force is generated by the magnetic field and not by mechanical elements, and consequently it is constant in time and does not cause wear on any mechanical element of the system.

A force of opposite direction is generated when the permanent magnets 57, 59 are displaced in opposite direction and consequently the appendages 57E of the permanent magnet 57 exit from the volume defined by the ferromagnetic plates forming the fixed ferromagnetic circuit of the system.

The rectilinear portions 57C and 59C of the edges facing the outside and orthogonal to the Y axis of the permanent magnets 57 and 59 performs a further function.

It is clear by observing FIG. 5, that the return force FRY increases abruptly when the magnet 59 tends to be displaced in the direction Y further toward the right in FIG. 5 until the edge portion 59C is beyond the outside edge of the set of plates forming the static outside ferromagnetic circuit. This abrupt increase of the return force is equivalent to abutting against a mechanical element. The magnetic force generated on the moving magnetic element by the electrical signal in the coils or by any other external disturbance is not sufficient to overcome the return force that is generated when this position is reached. Therefore, through appropriate shaping of the permanent magnets 57, 59, an effect equivalent to a mechanical limit stop is obtained. As the magnet 57 has an edge 57C shaped in a similar manner, the stop acts in both directions according to the direction of the main movement parallel to the Y axis and this prevents the moving magnetic element 47 from exiting from the air gap 45.

Figure 6:
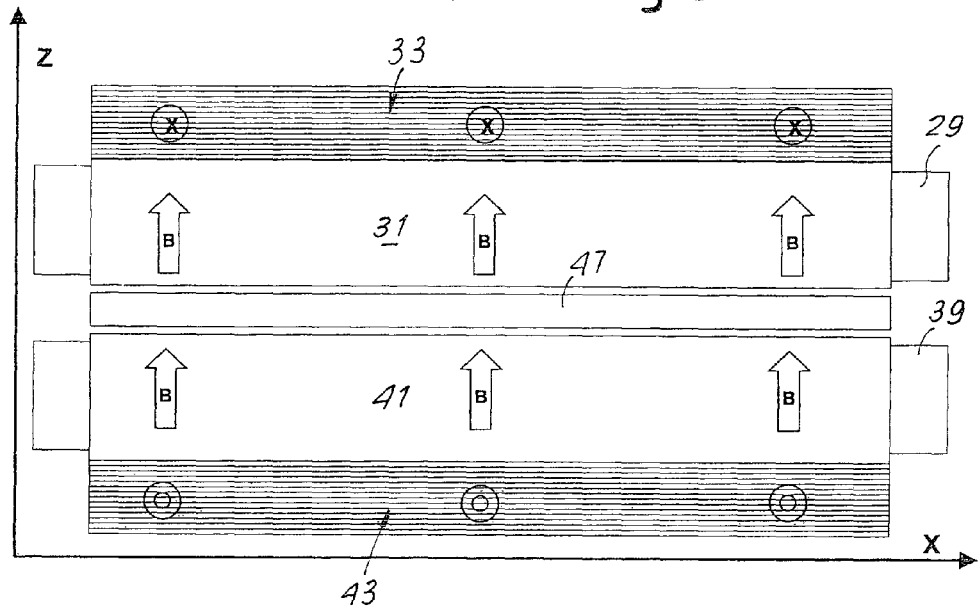
FIG. 6 shows a view according to VI-VI of FIG. 2, i.e. according to a plane orthogonal to the X axis.
Figure 7:
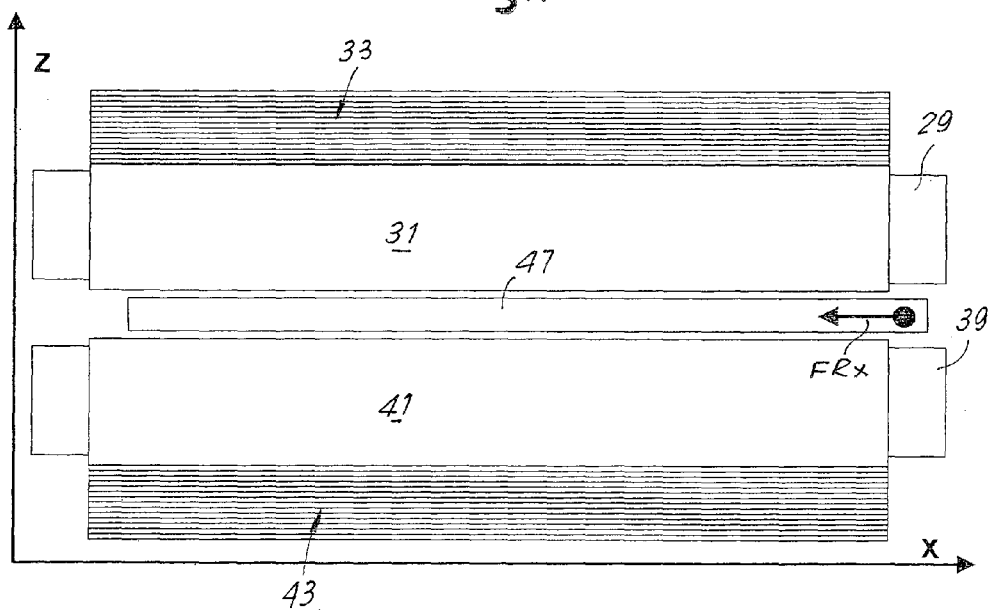
FIG. 7 shows a view similar to the view of FIG. 6, but with the movable element displaced laterally with respect to a direction parallel to the X axis.

A similar function is obtained to guarantee centering of the moving magnetic element 47 with the permanent magnets 57, 59 in the X direction, i.e. orthogonally to the direction of the main movement (Y axis). This is easily understood by observing FIGS. 4, 6 and 7, FIGS. 6 and 7 being a front view according to VI VI of FIGS. 2 and 4. As can be observed in the drawing, the length of the permanent magnets 57, 59 according to the X axis is substantially equal to the length of the plates 31 and 41 interposed between the turns of the winding forming the coil 29 and of the winding forming the coil 39. Consequently, the magnets will tend to take the position of FIG. 6 of minimum reluctance of the ferromagnetic circuit. A transverse displacement according to the X axis, as represented in FIG. 7, causes immediate generation of a strong return force FRX shown in FIG. 7, which opposes this movement. The force FRX is generated immediately also for a minimum displacement along the X axis, due to the fact that the length in the X direction of the permanent magnets 57, 59 is equal or substantially equal to the length of the plates 31 and 41.

In this manner the moving magnetic element 47 with which the permanent magnets 57 and 59 are integral is automatically centered according to the X direction. Also in this case a guide and an abutment effect equivalent to a mechanical stop are obtained without the use of mechanical members subject to wear.

FIG. 8 shows, in an exploded view, a constructional embodiment of an electromechanical conversion system based on the configuration described above with reference to the diagrams of FIGS. 2 to 7. The same numbers indicate parts that are the same or equivalent to those described above.

In FIG. 8 the electromechanical conversion system 21 is housed in a container configured in the shape of a box with two housings 61 and 63. The coil 29, with the respective portion of ferromagnetic circuit 31, 33, is arranged in the housing 61, while the coil 39, with the portion of ferromagnetic circuit 41, 43, is arranged in the lower housing 63. Bushing connectors, defining the connections 49, 51 and 53, 55 of the coils 29 and 39 respectively, project from the housings 61 and 63.

All the parts contained in the housings 61 and 63 are embedded in a cast resin (not represented in the figures) so as to allow, after hardening of the resin, machining of the outside surface by mechanical milling. This produces high precision leveling, which allows minimum tolerances to be reached in the air gap that is formed after coupling the housings 61 and 63. The greater the flatness between couplings is, the lower the friction forces between moving part's and fixed parts due to imbalances between forces of attraction will be.

In fact, as can be understood from the description above, the moving magnetic element 47 with the permanent magnets 57, 59 is in theory suspended in the air gap 45 due to perfect balancing between the magnetic forces of attraction exerted between the ferromagnetic circuit and the permanent magnets. However, this suspension without contact is an ideal condition which in practice does not occur due to inevitable minimum imbalances that lead to possible mutual contact between fixed part and moving part. The frictions that are generated due to this contact are minimized by the precision milling operation described above.

In order to limit friction between the moving part constituted by the moving magnetic element 47 and magnets 57, 59 on one side and the fixed part formed by the ferromagnetic circuit 31, 41, 33, 43 and the coils 29, 39, sheets or films made of material with low friction coefficient, indicated with 71 and 73, are arranged on the milled faces of the fixed parts. These sheets can be made of PTFE or other material with low friction coefficient. They are in contact on one side with the fixed part of the system and on the other with the moving magnetic element 47 and with the permanent magnets 57, 59. Additional lubrication can also be provided on the faces of the films 71 and 73 facing the air gap. This lubrication can be obtained, for example, with the use of a ferromagnetic liquid known as "ferrofluid", not represented in the figure. The particular ferromagnetic Characteristics of this liquid cause it to be retained inside the air gap 45 through simple magnetic attraction and to be concentrated in the points in which there is the greatest possibility of friction between the moving magnetic element 47 and the magnets 57, 59 on the one side and the low friction films 71 and 73 on the other side.

In the embodiment shown in FIG. 8, the moving magnetic element comprises a structure, again indicated with 47, which in this case is formed by a sort of grill in suitable magnetic material, which forms seats for housing and blocking the permanent magnets 57, 59. In some embodiments this structure 47 can be made of glass-filled nylon, although it can also be made of other suitable materials. Inside the structure 47, seats 47a are defined, in which the permanent magnets 57, 59 are blocked and glued if necessary.

In the description above reference has been made to a simplified configuration in which only two permanent magnets 57, 59, integral with the structure 47, are arranged in the air gap 45. However, in the constructional embodiment shown in FIG. 8, the structure 47 has four seats for two pairs of permanent magnets, again indicated with 57 and 59. In substance, two permanent magnets 57 mutually aligned along the X axis and two opposed permanent magnets 59 mutually aligned along the X axis are provided, each pair 57, 57 and 59, 59 of permanent magnets having the same function as the single permanent magnet 57 and as the single permanent magnet 59 described above. Moreover, as can be observed in FIG. 8, each of the permanent magnets 57, 59 can be designed with rectilinear edges parallel to the X axis and appendages projecting in the Y direction toward the outside of the air gap 45, for the purposes defined above.

The structure 47 has a shape designed to have a high tensile strength in the Y direction, i.e. in the direction of the main movement imparted by the electromagnetic force to the moving magnetic element 47, 57, 59. In some embodiments, the structure 47 can have the form of a grid or grill with holes to reduce the weight and the contact surface between the structure and the sheets of low friction film 71, 73, so as to further reduce the friction forces that are generated between these components.

During assembly, the two housings 61, 63 are mutually superimposed, with the coils 29, 39 mutually facing and with spacers 70 of calibrated thickness interposed between the coils. These spacers 70 define the distance of the support surfaces of the coils and therefore the dimension of the air gap 45 inside the resulting ferromagnetic circuit. The spacers 70 are made of non-magnetic material, such as brass, aluminum, bronze or plastic material with a high compression strength, to prevent circulation of magnetic flux through unwanted paths. The device is completed by clamping elements 72, 74, which mutually constrain and block the housings 61, 63. The clamping elements 72, 74 are also preferably made of non-magnetic material, such as stainless steel, to avoid creating unwanted magnetic closing circuits.

Members 48 are arranged along an edge 47B of the structure 47 facing the outside of the air gap, to constrain the moving magnetic element 47, 57, 59 to the diaphragm of an acoustic diffuser or to any other member that must be operated by the electromechanical conversion system described above.

Figure 8A:
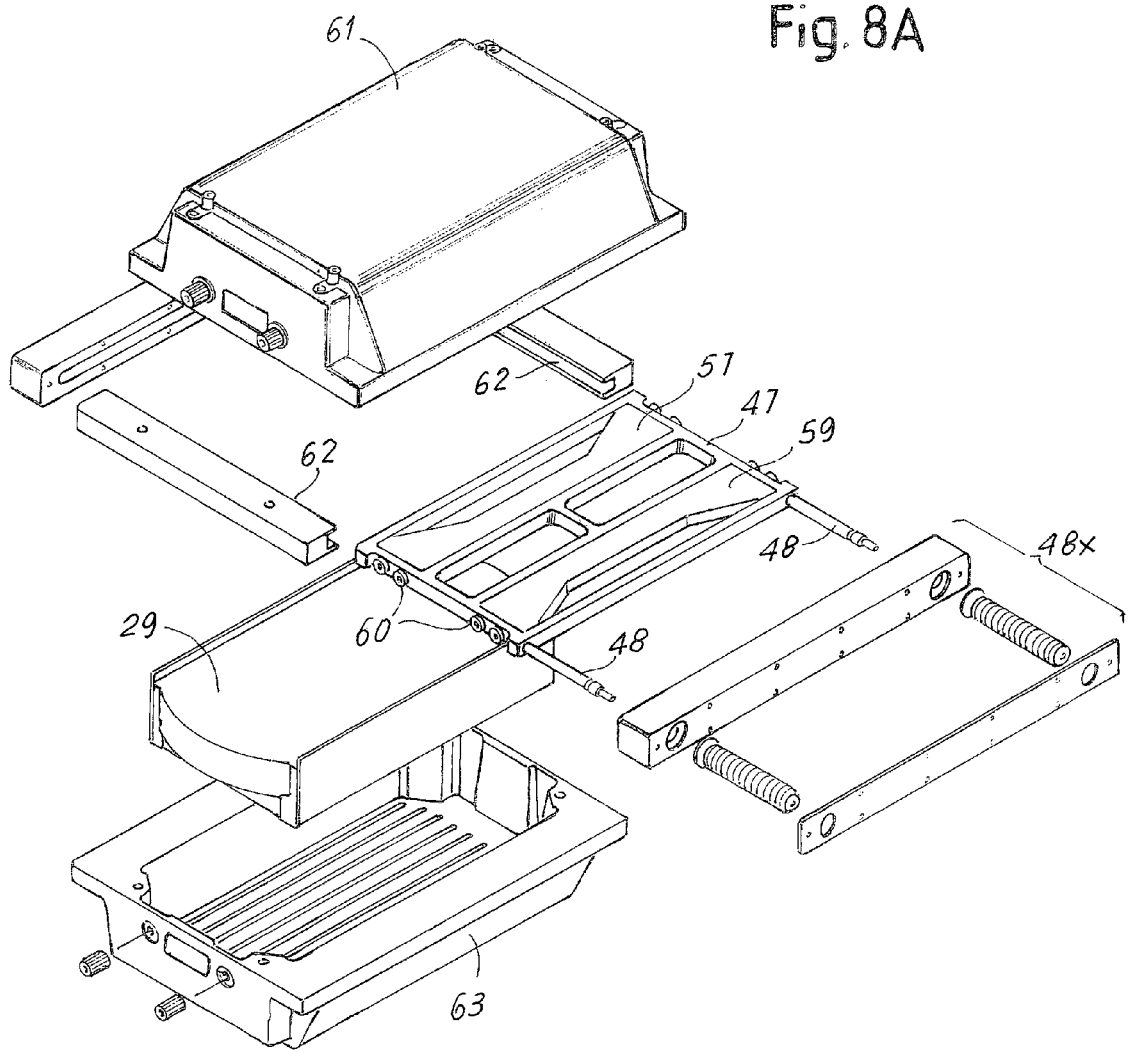
FIG. 8A shows an exploded view, similar to the view of FIG. 8, in a modified embodiment.

FIG. 8A shows an exploded view of an embodiment modified with respect to the embodiment shown in FIG. 8. The same numbers indicate parts that are the same or equivalent to those of FIG. 8. In this embodiment the sheets 71 and 73 of low friction coefficient material are omitted. The moving magnetic element 47 comprises, in this case, two permanent magnets 57, 59 housed in the frame structure of the moving magnetic element 47, instead of four permanent magnets. However, it must be understood that also in this configuration a different number of permanent magnets could be provided, for example four permanent magnets, as in FIG. 8. The moving magnetic element 47 is equipped with bearings, for example ball bearings 60, guided in opposed guides 62 integral with the container formed by coupling of the housings 61, 63. These bearings replace the low friction sheets 71, 73 shown in FIG. 8. In other embodiments, not shown, the supporting and sliding system could be designed differently, for example with slides or other low friction supports, sliding in guides similar to the guides 62 and integral with the moving magnetic element 47. The numbers 48, 48X once again indicate mechanical members for connection of the moving magnetic element 47 to a member made to move by the device, for example the diaphragm of an acoustic diffuser.

Figure 9:
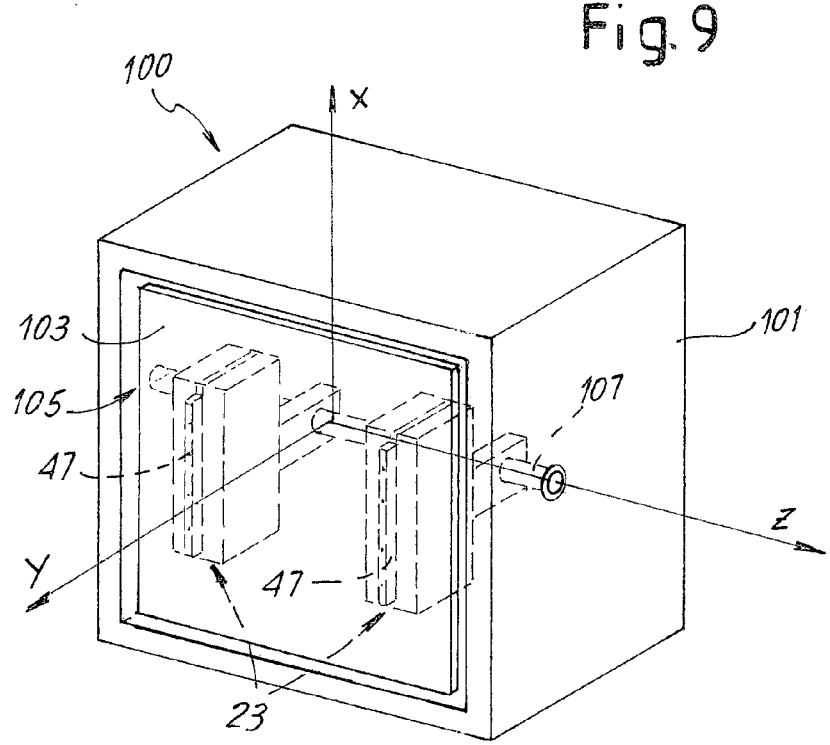
FIG. 9 shows a perspective view of an acoustic diffuser using two electromechanical conversion systems according to the invention.
Figure 10:
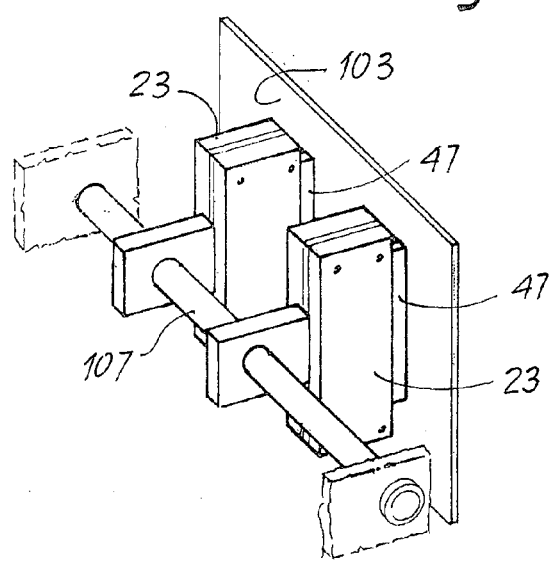
FIG. 10 shows a perspective back view of the diaphragm of the acoustic diffuser of FIG. 9.

FIGS. 9 and 10 schematically show an acoustic diffuser produced using two electromechanical conversion systems of the type described above to act on a vibrating diaphragm that transforms the movement of the motors formed by the conversion system into sound waves.

In FIG. 9 the diffuser is indicated as a whole with 100. It comprises a fixed structure with a box 101, in the shape of a parallelepiped in the example shown. One of the sides of the parallelepiped is open and a vibrating panel or diaphragm 103 is arranged in the opening. Advantageously, in the example shown an opening 105 of limited width is defined between the edges of the vibrating diaphragm 103 and the edges of the opening 105 provided in the structure of the box 101, to connect the inner volume of the box formed by the structure 101 with the outside environment.

The diaphragm 103 is constrained to the two movable elements 47 of the two electromechanical conversion systems 23 located inside the box 101. The fixed parts of the two conversion systems 23, formed by the coils, by the ferromagnetic circuit and by the housing 61, 63, are integral with the structure 101 by means of a supporting frame 107. The electrical signal supplied by an amplifier (not shown), whose outputs are connected to the electromagnetic conversion systems 23, causes vibration of the diaphragm 103 and the consequent generation of sound waves. The box 101 supplies, in a known manner, a resonance effect. FIG. 10 shows a back view of a detail of the frame which rigidly connects the fixed part of the two conversion systems 23 to the box 101.

Therefore, the invention also relates to an acoustic diffuser comprising a fixed load-bearing structure to which one or more electromagnetic conversions systems of the type described above are constrained, the moving magnetic elements of which are constrained to a vibrating panel or diaphragm suspended by means of said conversion system or systems. The weight of the diaphragm can be sustained by the magnetic force that opposes decentering of the moving magnetic elements 47 in the X direction (FIGS. 6, 7).

In the examples described above, the conversion system 23 has a substantially symmetrical structure, with two opposed excitation coils, each equipped with ferromagnetic plates that form the fixed ferromagnetic circuit and with the movable element 47 housed between the two opposed coils. This solution is currently preferred, but the invention can also be implemented in other ways, for example with a single excitation coil.

Figure 11:
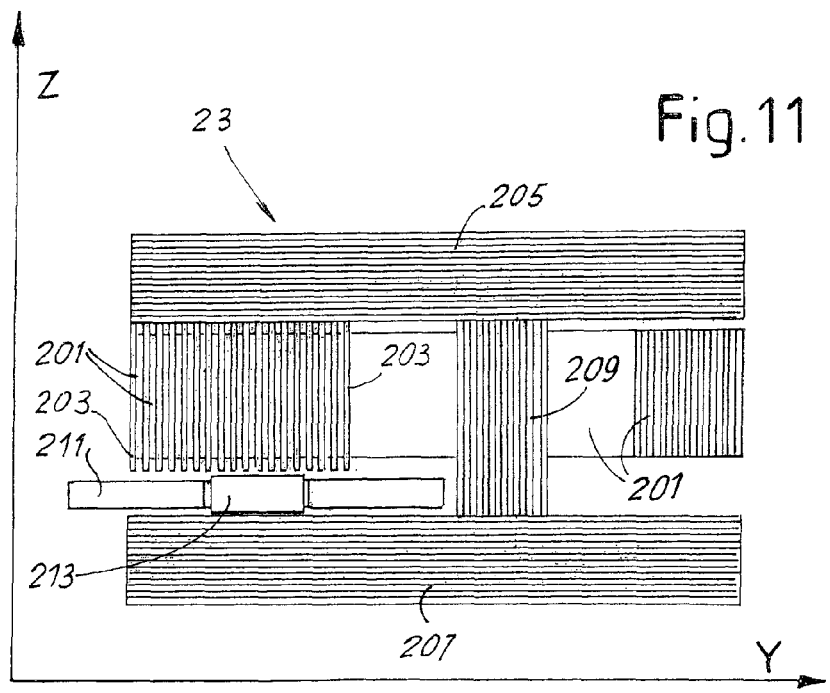
FIGS. 11 and 12 show sectional views of modified embodiments of the conversion system according to the invention, in arrangements using only one excitation coil.

FIG. 11 shows an embodiment of an electromagnetic conversion system, once again indicated with 23, with a single coil, indicated here with 201. The coil is intended to be mounted fixed with respect to a load-bearing structure. It is associated with a ferromagnetic circuit comprising ferromagnetic plates 203 interposed between turns of the conductor forming the coil 201. Unlike the examples described with reference to FIGS. 2 to 8, in this case a single plate 203 is arranged between two adjacent turns. The ferromagnetic circuit is completed by two sets of outside plates 205, 207 and by a ferromagnetic column 209, preferably also formed by plates to reduce eddy currents. The moving magnetic element is indicated with 211 and is equipped with a permanent magnet 213. This is placed in an air gap formed between the plates 207 and the plates 203.

Figure 12:
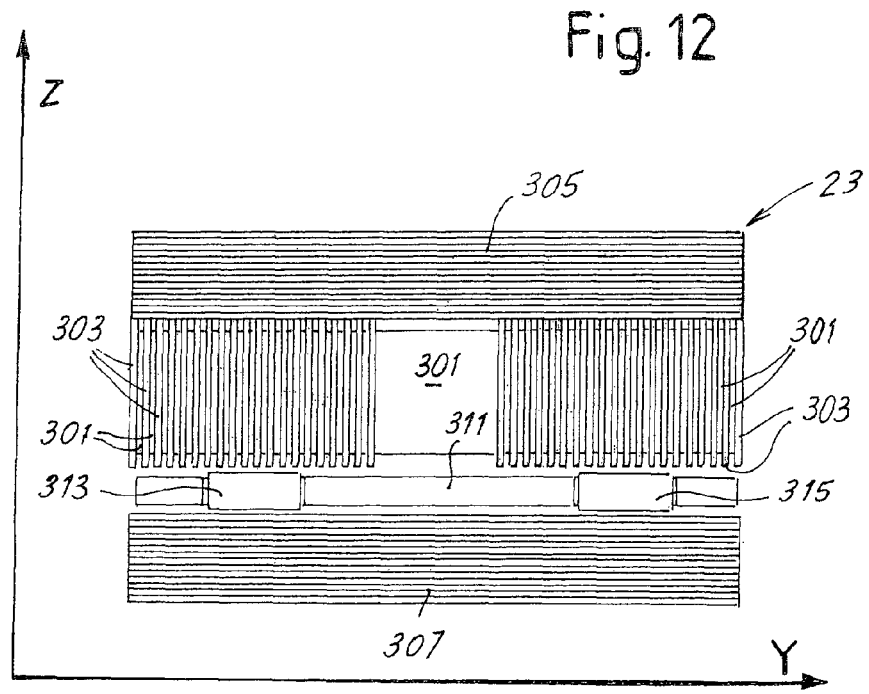

FIG. 12 shows a further embodiment of a conversion system according to the invention, once again indicated as a whole with 23, with a single excitation coil indicated with 301. Ferromagnetic plates 303 are interposed between adjacent turns of the coil 301, and form a ferromagnetic circuit together with two blocks of ferromagnetic material 305, 307, preferably also constituted by respective plates. A moving magnetic element 311, equivalent to the movable element 211 and to the movable element 47 of the preceding embodiments, is housed in the air gap formed between the ferromagnetic block 307 and the plate 303. Permanent magnets 313 and 315 are fixed to the movable element 311

The single components of the examples of FIGS. 11 and 12 can be formed in the same manner as the corresponding elements illustrated and described with reference to FIGS. 2 to 8.

Figure 13:
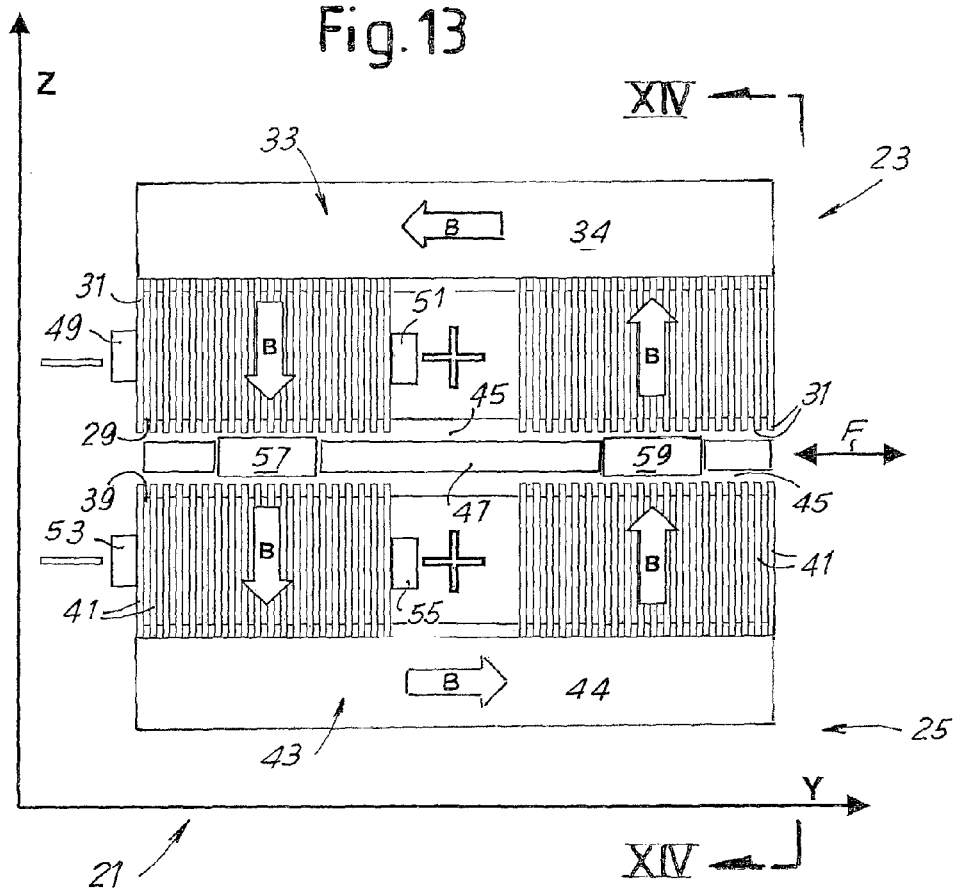
FIGS. 13 and 14 show a conversion system according to the invention in a variant with respect to the embodiment of FIGS. 1 to 7.
Figure 14:
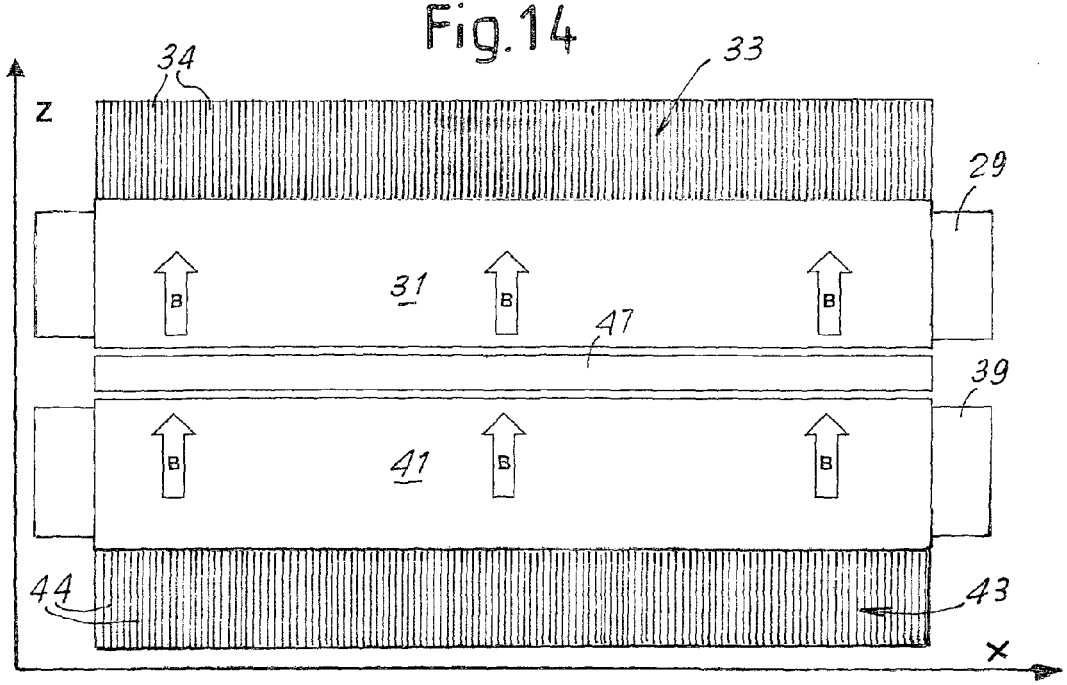

FIGS. 13 and 14 show sections similar to those of FIGS. 2 and 6 in a modified embodiment. The same numbers indicate the same or equivalent parts to those of the embodiment of FIGS. 1 to 7. The difference between the embodiment of FIGS. 1 to 7 and the embodiment of FIGS. 13 and 14 consists in the different orientation of the plates 34, 44 forming the portions 33 and 43 of the ferromagnetic circuit outside the coils 29 and 39. As can be observed in FIGS. 13 and 14, in this embodiment, the plates 34 and 44 are arranged edge-on on the outer surface of the respective coil 29 and 39.

In the various embodiments shown the plates are preferably treated on the surface to be electrically isolated, in order to prevent or reduce the circulation of eddy currents and the resulting losses.

Preferably, as shown in FIG. 8, the magnets have small dimensions and are separated from the structural elements of the movable element in order to simplify production of the permanent magnets and strengthen the structure to which they are constrained, which is subject to high static and dynamic stresses.

It is understood that the accompanying drawing and the description above refer to some possible non-limiting examples of embodiment of the invention, which can vary in forms and arrangements, without thereby departing from the scope of the concept underlying the invention.

The invention claimed is:
1. An electromechanical conversion system comprising:
a fixed supporting structure;
a movable element, said movable element being movable with respect to the fixed supporting structure according to a direction of motion;
at least one excitation coil comprising a strip shaped conductor wound about a coil axis, said coil axis being orthogonal to said direction of motion of said movable element, said movable element being arranged outside said excitation coil;
at least one magnet for generating an excitation magnetic field, wherein said at least one magnet is integral with the movable element and said excitation coil is integral with the fixed supporting structure, said at least one magnet comprising poles, said poles being aligned orthogonal to said direction of motion; and
a ferromagnetic circuit cooperating with said at least one magnet, said ferromagnetic circuit being fixed with respect to said fixed supporting structure, wherein a plurality of plates of ferromagnetic material forming part of said ferromagnetic circuit are inserted between turns of said excitation coil.

2. A system according to claim 1, wherein:
said conductor is in a shape of a strip of rectangular cross section with a major dimension and a minor dimension, the major dimension of the cross section of the conductor being parallel to an axis of the excitation coil and the minor dimension of the cross section of the conductor being orthogonal to the axis of the excitation coil, said strip being wound to form mutually superimposed turns which are gradually distanced from the axis of the excitation coil.

3. A system according to claim 1, wherein:
said plates of ferromagnetic material project at least from a first face of the excitation coil, orthogonal to an axis of the excitation coil; and
a projecting part of said plates is interfaced with a portion of said ferromagnetic circuit arranged outside the excitation coil.

4. A system according to claim 3, wherein said portion of ferromagnetic circuit is formed by ferromagnetic plates positioned side by side, mutually parallel and substantially orthogonal to the ferromagnetic plates interposed between the turns of the excitation coil.

5. A system according to claim 3, wherein said plates of ferromagnetic material interposed between the turns of the excitation coil project from a second face of the excitation coil, parallel to said first face.

6. A system according to claim 1, wherein said at least one magnet is arranged with at least one pole thereof facing said at least one excitation coil.

7. A system according to claim 1, wherein said movable element is integral with two permanent magnets arranged with opposite polarities.

8. A system according to claim 1, further comprising:
another excitation coil to provide at least two excitation coils, said at least two excitation coils mutually facing and defining therebetween an air gap, wherein said movable element is arranged for moving according to said direction of motion orthogonal to axes of said two excitation coils, said at least one magnet being arranged with opposed magnetic poles facing said at least two excitation coils.

9. A system according to claim 8, wherein:
in each of said at least two excitation coils are inserted ferromagnetic plates interposed between the turns of the excitation coil and projecting from both faces of the at least two excitation coils, the opposed plates inserted between the turns of the at least two excitation coils defining an air gap of said ferromagnetic circuit between the at least two excitation coils, said ferromagnetic circuit comprising the plates inserted in the at least two excitation coils and portions of said ferromagnetic circuit outside the at least two excitation coils, arranged on the outside of the faces of the at least two excitation coils opposite said air gap.

10. A system according to claim 8, wherein:
a magnetic flux in the portion of said ferromagnetic circuit formed by the plates interposed between the turns of the excitation coils is substantially parallel to an axis of the at least two excitation coils and to main surfaces of said plates interposed between the turns of the at least two excitation coils; and
outside said at least two excitation coils said magnetic field is substantially orthogonal to the main surfaces of the plates interposed between the turns of the at least two excitation coils and to the axis of the at least two excitation coils.

11. A system according to claim 8, wherein sheets made of material with low friction coefficient are inserted in said air gap, interposed between each excitation coil and the movable element.

12. A system according to claim 8, wherein a lubricant is contained in said air gap.

13. A system according to claim 1, wherein said at least one excitation coil comprises turns of elongated shape forming a set of turns, whose cross section according to a plane orthogonal to the coil axis is approximately rectangular with a major side and a minor side, a force caused by circulation of electric current in said excitation coil orthogonal to said major side acting on the movable element.

14. A system according to claim 8, wherein said movable element comprises at least two permanent magnets mutually connected mechanically and arranged between said two excitation coils, said two permanent magnets being configured and positioned in a substantially symmetrical manner with respect to a plane orthogonal to mutually opposed faces of the excitation coils and to a direction of a force acting on the movable element caused by circulation of electric current in said excitation coils.

15. A system according to claim 14, wherein said at least two permanent magnets are arranged with opposite polarities, one of said at least two permanent magnets being oriented with a north pole toward said at least one excitation coil and a south pole toward said another excitation coil and another one of said magnets being oriented with a south pole toward said at least one excitation coil and with a north pole toward said another excitation coil.

16. A system according to claim 14, wherein said at least two permanent magnets are shaped and arranged so as to generate return forces toward a centered rest position with respect to said two excitation coils.

17. A system according to claim 14, wherein said permanent magnets are shaped and arranged to generate a centering force with respect to a median axis parallel to the direction of the force acting on the movable element induced by the current circulating in said excitation coils.

18. A system according to claim 16, wherein said at least two permanent magnets are shaped so as to generate a return force toward a position of minimum reluctance of the ferromagnetic circuit defining a rest position of said movable element.

19. A system according to claim 18, wherein said at least two permanent magnets are shaped to define two magnetic stops that limit a position of maximum displacement of the movable element with respect to a rest position in both directions of movement caused by the circulation of electric current in said excitation coils.

20. A system according to claim 16, wherein each of said two permanent magnets comprises an edge facing outside the air gap and substantially orthogonal to the direction of movement induced by the electric current circulating in said at least two excitation coils, each of said edges having sloping end segments, forming appendages facing outside the air gap with respect to a central portion of the respective edge, on each magnet said appendages being substantially symmetrical with respect to a plane parallel to the direction of movement of the movable element and to axes of the excitation coils.

21. A system according to claim 3, wherein:
said conductor is in a shape of a strip of rectangular cross section with a major dimension and a minor dimension, the major dimension of the cross section of the conductor being parallel to an axis of the excitation coil and the minor dimension of the cross section of the conductor being orthogonal to the axis of the excitation coil, said strip being wound to form mutually superimposed turns which are gradually distanced from the axis of the excitation coil.

22. A system according to claim 2, wherein:
said plates of ferromagnetic material project at least from a first face of the excitation coil, orthogonal to an axis of the excitation coil; and a projecting part of said plates is interfaced with a portion of said ferromagnetic circuit arranged outside the excitation coil.

23. A system according to claim 22, wherein said portion of ferromagnetic circuit is formed by ferromagnetic plates positioned side by side, mutually parallel and substantially orthogonal to the ferromagnetic plates interposed between the turns of the excitation coil.

24. An electromechanical conversion system comprising:
a fixed supporting structure;
a movable element, said movable element being movable in a direction of motion with respect to said fixed supporting structure;
at least one excitation coil integral with said fixed supporting structure, said at least one excitation coil being made of a strip shaped conductor wound about a coil axis, said coil axis being orthogonal to said direction of motion of said movable element, said movable element being arranged at a position outside of said at least one excitation coil;
at least one magnet for generating an excitation magnetic field, integral with said movable element, said magnet comprising poles aligned orthogonal to said direction of motion; and
a ferromagnetic circuit fixed with respect to said fixed supporting structure and cooperating with said at least one magnet, wherein said ferromagnetic circuit is formed at least in part by the at least one excitation coil, said at least one excitation coil being made of ferromagnetic material.

25. A system according to claim 24, wherein:
said conductor is in a shape of a strip of rectangular cross section with a major dimension and a minor dimension, the major dimension of the cross section of the conductor being parallel to an axis of the at least one excitation coil and the minor dimension of the cross section of the conductor being orthogonal to the axis of the at least one excitation coil, said strip being wound to form mutually superimposed turns which are gradually distanced from the axis of the at least one excitation coil.

26. A system according to claim 24, further comprising:
another excitation coil to provide at least two excitation coils, said at least two excitation coils being coaxial and mutually facing each other and defining therebetween an air gap, wherein said movable element is arranged for moving according to said direction of motion orthogonal to the axes of said two excitation coils, wherein said at least one magnet is arranged with opposed magnetic poles facing said at least two excitation coils.

27. An acoustic diffuser comprising:
a housing and a moving diaphragm, whose movement generates sound waves;
at least one electromechanical conversion system comprising a fixed supporting structure, a movable element movable with respect to the fixed supporting structure in a direction of motion, at least one excitation coil comprising a strip shaped conductor spirally wound about a coil axis, at least one magnet for generating an excitation magnetic field and a ferromagnetic circuit cooperating with said at least one magnet, said at least one magnet having poles aligned orthogonal to said direction of motion, said coil axis being orthogonal to said direction of motion of said movable element, said movable element being arranged outside said at least one excitation coil, wherein said at least one magnet is integral with the movable element and said at least one excitation coil is integral with the fixed supporting structure, wherein said ferromagnetic circuit is fixed with respect to said fixed supporting structure, wherein said at least one excitation coil comprises a plurality of plates of ferromagnetic material forming part of said ferromagnetic circuit, said plurality of plates being inserted between turns of said at least one excitation coil, wherein said at least one excitation coil is fixed with respect to the housing and the movable element is constrained to the diaphragm, the movement of the movable element causing vibration of the diaphragm.

\* \* \* \* \*